United States Patent
Marsh et al.

(10) Patent No.: US 6,539,204 B1
(45) Date of Patent: Mar. 25, 2003

(54) ANALOG ACTIVE CANCELLATION OF A WIRELESS COUPLED TRANSMIT SIGNAL

(75) Inventors: Gene Marsh, Del Mar, CA (US); Todd Sutton, Del Mar, CA (US)

(73) Assignee: Mobilian Corporation, Hillsboro, OR (US)

( * ) Notice: Subject to any disclaimer, the term of this patent is extended or adjusted under 35 U.S.C. 154(b) by 312 days.

(21) Appl. No.: 09/675,309

(22) Filed: Sep. 29, 2000

(51) Int. Cl.[7] ............................................... H04B 15/00
(52) U.S. Cl. ......................................... 455/63; 455/296
(58) Field of Search ............................... 455/63, 24, 73, 455/78, 296, 295, 278.1, 305

(56) References Cited

U.S. PATENT DOCUMENTS

| | | | |
|---|---|---|---|
| 4,383,331 A | 5/1983 | Davidson | |
| 4,475,243 A | * 10/1984 | Batlivala et al. | 455/22 |
| 4,660,042 A | 4/1987 | Ekstrom | |
| 5,974,301 A | * 10/1999 | Palmer et al. | 455/63 |

FOREIGN PATENT DOCUMENTS

WO    WO 96/15596 A1    5/1996

* cited by examiner

*Primary Examiner*—Nguyen T. Vo
(74) *Attorney, Agent, or Firm*—Cooley Godward LLP

(57) ABSTRACT

An active cancellation device receives a model of a first signal from a local wireless transmitter. The first signal causes a coupled signal that interferes in a second signal received by a local wireless receiver from a remote wireless transmitter. The active cancellation device generates a cancellation signal based on the model of the first signal, and provides the cancellation signal to the local wireless receiver. At the local wireless receiver, the cancellation signal combines with the coupled signal and the second signal. The cancellation signal reduces the interference in the second signal caused by the coupled signal.

17 Claims, 12 Drawing Sheets

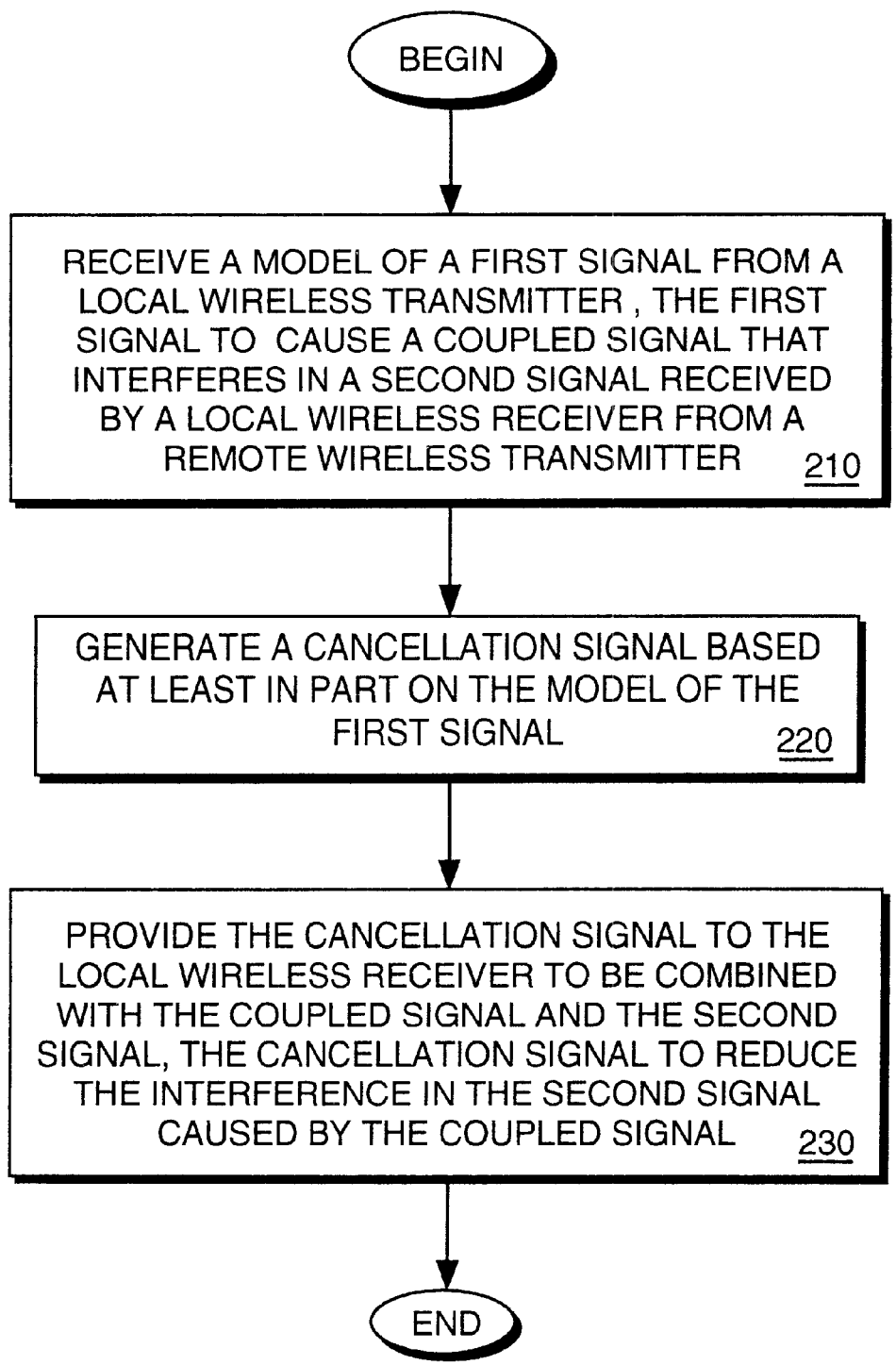

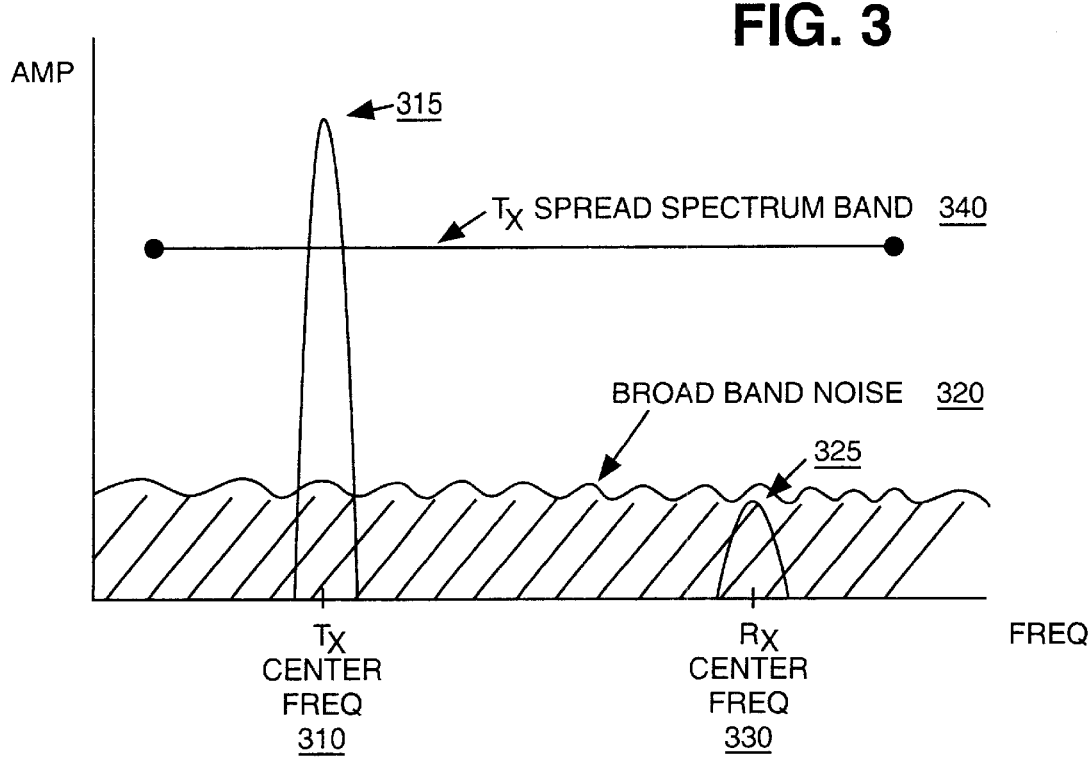
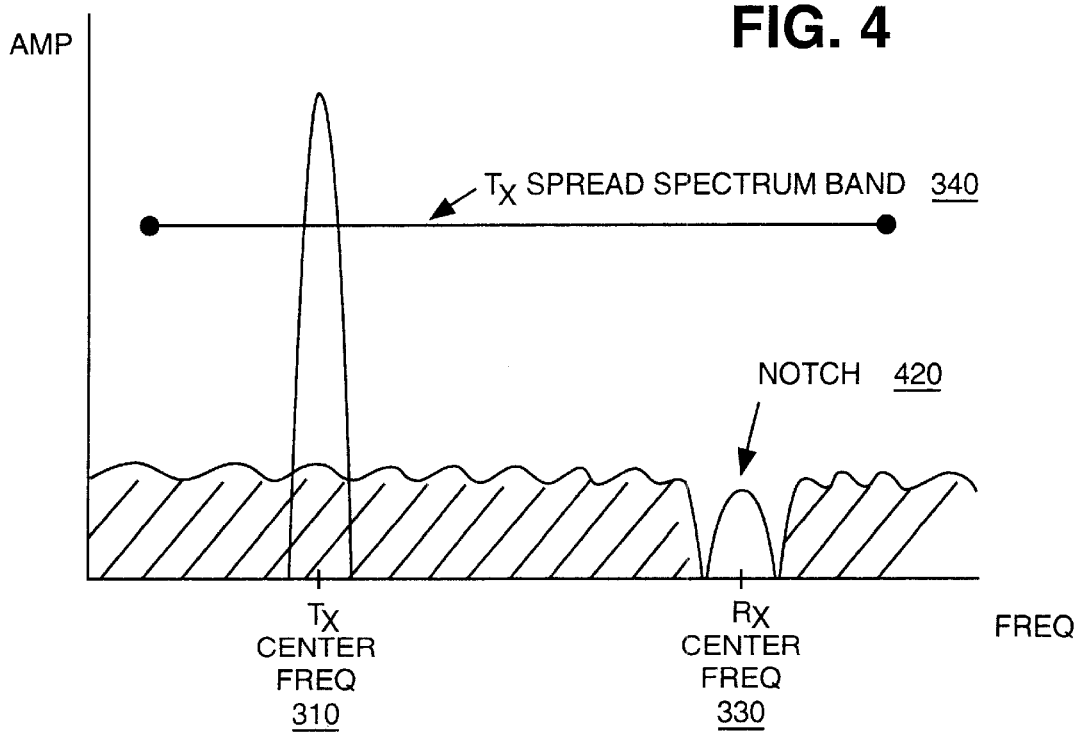

ANALOG ACTIVE CANCELLATION OF A WIRELESS COUPLED TRANSMIT SIGNAL

FIELD OF THE INVENTION

The present invention pertains to the field of wireless communications. More particularly, this invention relates to active cancellation of wireless transmissions coupled in a wireless receiver.

BACKGROUND

Wireless communications offer increased convenience, versatility, and mobility compared to wireline alternatives. Cellular phones, wireless computer networking, and wireless peripheral components, such as a wireless mouse, wireless headphones, or a wireless keyboard, are but a few examples of how wireless communications have permeated daily life. Countless additional wireless technologies and applications are likely to be developed in the years to come.

Wireless communications use various forms of signals, such as radio frequency (RF) signals, to transmit data. A transmitter broadcasts a signal from an antenna in a particular frequency band called a pass band. As the signal travels, the signal loses power or attenuates. The farther the signal travels, the more the signal attenuates.

The signal also encounters various forms of interference along the way that introduce noise in the signal. The transmitter itself introduces noise. Signals from other transmitters also introduce noise. A receiver trying to receive the signal is likely to introduce a comparative large amount of noise. Virtually anything can cause noise, including the ground, the sky, the sun, and just about any animate or inanimate object.

At some distance from the transmitter, the signal will attenuate to the point that it becomes lost in noise. When noise overpowers a signal, the signal and the data it is carrying are often unrecoverable. That is, depending on the distance a signal travels and the amount of noise mixed with the signal, a receiver may or may not be able to extract the signal.

A transmitter that is in relatively close proximity to a receiver will introduce noise in the receiver when the transmitter transmits. The noise is called a coupled signal. A coupled signal may introduce so much noise that the receiver cannot receive any other signals. Signal coupling is a major obstacle in wireless communications. Devices that include both a transmitter and a receiver must isolate the transmitter from the receiver so that the coupled signal does not overpower the receiver.

One approach to isolating a transmitter from a receiver is half duplex communications. A half duplex device cannot simultaneously send and receive. A common example is a hand-held, two-way radio. When a user pushes a button to talk into the radio, the user cannot simultaneously listen to signals from other radios. That is, the receiver is disabled when the transmitter is transmitting. If the receiver were not disabled while the transmitter transmits, the transmitter would probably over power the receiver with noise.

Isolation is particularly troublesome in devices that include more than one on-board radio. For instance, a portable computer may include more than one radio to enable more than one simultaneous wireless service. A transmission from any one radio may over power receivers in multiple radios. One approach to isolating multiple transmitters from multiple receivers is time division duplex (TDD) communications. In a TDD device, all receivers are disabled when any one transmitter transmits.

A cellular phone, on the other hand, is a full duplex wireless communication device. That is, a cellular phone simultaneously transmits and receives signals so that a user can talk and listen at the same time. A cellular phone isolates its transmitter from its receiver by using two different frequency bands—one band for transmitting and one band for receiving.

None of these isolation solutions are particularly satisfying. Half duplex and TDD communications have the obvious disadvantage that a user cannot simultaneously send and receive. This poses a substantial performance limitation that will become more pronounced as more wireless communications applications and technologies are developed and adopted, and more devices include multiple on-board radios.

Full duplex communications that rely on two isolated frequency bands for sending and receiving data have the obvious disadvantage of using twice as much frequency bandwidth as half duplex communications. This poses a substantial performance limitation that will also become more pronounced as the numbers of competing wireless applications and users continues to increase, and available bandwidth continues to decrease.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

FIG. 2 demonstrates one embodiment of the present invention.

FIG. 3 illustrates one embodiment of a transmitted signal coupled with a received signal at a wireless receiver.

FIG. 4 illustrates one embodiment of the present invention for narrow band active cancellation.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The present invention reduces the noise effects of a transmitter located in close proximity to a receiver. Using various embodiments of the present invention, a wireless device can simultaneously transmit and receive, even within the same frequency band. This is a fundamental improvement over the prior art. For instance, where a cellular service provider has enough frequency bandwidth to serve one million prior art cellular phones using two frequency bands per phone, embodiments of the present invention may allow two million cellular phones to be served. Similarly, embodiments of the present invention allow multiple half duplex and/or full duplex radios to be isolated within a single device, even on the same chip.

Figure 1:
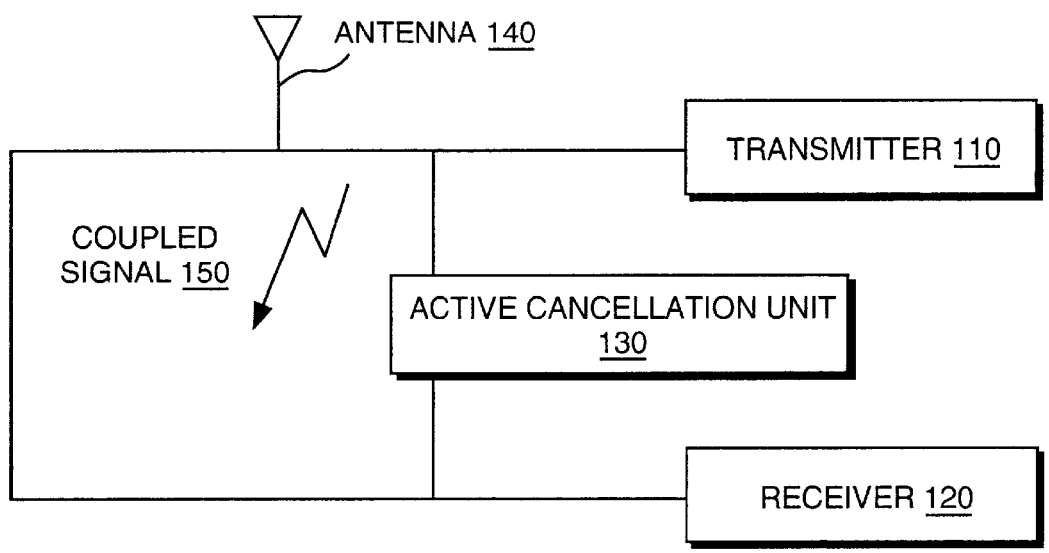
FIG. 1 illustrates one embodiment of the present invention.

FIG. 1 illustrates one embodiment of the present invention. Transmitter 110 transmits a signal from antenna 140. Receiver 120 receives a signal from antenna 140. If transmitter 110 is transmitting at the same time receiver 120 is receiving, the signal that receiver 120 receives includes a coupled signal 150. Active cancellation unit 130 introduces a cancellation signal to reduce the coupled signal 150 at receiver 120.

In one embodiment, FIG. 1 represents a full duplex device such as a cellular phone. By reducing the coupled signal 150 at receiver 120, a full duplex device may be able to transmit and receive in the same frequency band.

FIG. 2 demonstrates one embodiment of active cancellation unit 130. At 210, the active cancellation unit receives a model of a first signal that is being transmitted from the local transmitter, transmitter 110. As described below, a signal splitter can be used to split off part of the transmitter's output and provide a portion of the transmitted signal to the active cancellation unit. For instance, if the splitter splits off ten percent of the transmitter's output, the model of the first signal will be a one-tenth replica of the transmitter's output signal. In alternate embodiments, any number of approaches can be used to provide a replica or copy of the transmitted signal to the active cancellation unit 130.

Meanwhile, the local receiver, receiver 120, is trying to receive a second signal from a remote transmitter (not shown). The first signal from the local transmitter causes interference, or noise, in the second signal received from the remote transmitter in the form of coupled signal 150. The local receiver requires at least a certain minimum signal to noise ratio to be able to extract the second signal. The additional noise from the local transmitter may significantly reduce the signal to noise ratio at the local receiver. If the second signal is overpowered by the noise, the receiver may not be able to recover it.

Even if the remote transmitter transmits the second signal at a higher amplitude than the amplitude of the coupled signal, the second signal from the remote transmitter will attenuate as it travels. At some distance from the remote transmitter, the second signal will drop below the noise level and become lost. In which case, if the coupled signal causes an increased level of noise at the local receiver, the coupled signal will at the very least reduce the range from which the local receiver can receive the second signal from the remote transmitter.

At 220, the active cancellation unit 130 generates a cancellation signal based at least in part on the model of the first signal. As discussed below, the cancellation signal may be generated in analog and/or digital circuitry in a variety of different ways. In various embodiments, generating the cancellation signal involves correlating the model of the first signal with the coupled signal at the receiver. That is, the coupled signal and the model of the first signal take different paths before reaching the active cancellation unit. The different paths may introduce different delays, phase shifts, and/or attenuations. Once the signals are correlated, the cancellation signal can be generated by delaying, phase shifting, and/or amplitude inverting the correlated model signal to create an inverted replica of the coupled signal as the coupled signal appears at the local receiver.

In one embodiment, a pilot tone is inserted into the first signal. In another embodiment in which the transmitter and receiver operate at the same center frequency, the pilot tone is the transmitted signal itself so no additional signal needs to be inserted. In either case, since the pilot tone is part of the first signal, it is also present in the model of the first signal and the coupled signal. The coupled signal and the model of the first signal can be correlated by matching the delay, phase, and amplitude of the pilot tone in the model of the first signal to the pilot tone in the second signal.

At 230, the active cancellation unit provides the cancellation signal to the local wireless receiver to be combined with the received signal. The cancellation signal destructively interferes with the coupled signal to reduce the noise level in the second signal caused by the first signal. As described below, a signal coupler can be used to combine the cancellation signal with the second signal. In alternate embodiments, any number of approaches can be used to combine the cancellation signal with the received signal.

If the pilot tone is cancelled from the second signal, then the coupled signal should also be cancelled. The cancellation can be "active" in that the signals can be correlated on an on-going basis or at particular intervals so as to adapt to changes in the coupled signal. For instance, as objects move in the vicinity of the transmitter and receiver, or as the transmitter and receiver are moved or change frequency bands, the path loss for the coupled signal may change. By repeatedly correlating the signals, the active cancellation can adapt to the changes. In one embodiment, the pilot tone is inserted in the first signal only when the signals are being correlated. In an alternate embodiment, the pilot tone is continuously present in the transmitted signal.

Coupled signal 150 may be coupled into the received signal in any number of ways. For instance, if transmitter 110 and receiver 120 are on the same chip, coupled signal 150 may travel through a ground plan of the chip. Even if transmitter 110 and receiver 120 are physically isolated and use separate antennas, the coupled signal could pass from one antenna to the other.

FIG. 3 illustrates one example of a coupled signal from a transmitter that is overpowering a receiver. In the illustrated embodiment, the transmitter is transmitting at center frequency 310 and the receiver is trying to receive a different signal 325 from a remote transmitter (not shown) at center frequency 330.

A center frequency is often the frequency of a carrier signal used by a transmitter or receiver. Information can be conveyed over the center frequency by, for instance, modulating the carrier frequency and/or phase. A pass band is the minimum frequency bandwidth needed to either side of a center frequency for modulation. In alternate embodiments, any number of techniques can be used for wireless data transmission, such as amplitude modulation.

In the illustrated embodiment, the pass bands of the transmitter and receiver do not overlap. The transmitted signal, however, includes both an intentional signal component 315 generated in the pass band around the center frequency 310 and a broadband noise component 320. The broadband noise 320 buries the signal from the remote transmitter. Virtually every transmitter generates noise because virtually every transmitter includes resistance and virtually every resistor generates noise.

Broadband noise 320 is also referred to as white noise. It is broadband in the sense that it is present in a wide frequency range. It is often completely unpredictable and can completely change from one instant in time to the next. Therefore, any time or phase differential between the broadband noise 320 and the cancellation signal could render the cancellation signal useless. That is, by the time the proper cancellation signal is generated, the white noise at the receiver may have completely changed compared to the instant in time from which the cancellation signal was generated.

In various embodiments, to alleviate some timing correlation problems, the broadband noise can be band limited by a pass band filter in the transmitter to limit the noise to a certain frequency range. By limiting the broad band noise, the noise is likely to remain constant, or prevented from decorrelating, for at least an instant in time. In general, if the decorrelation time for the noise is greater than the propagation delay for the coupled signal, the accuracy of the cancellation signal can be greatly improved. Stated another way, signal cancellation generally improves as the delay path for the coupled signal decreases. The delay path is often directly related to the distance between the transmitter and the receiver. This result provides an interesting relationship in that both the level of noise coupling and the accuracy of noise cancellation tend to increase as the distance between a transmitter and a receiver decreases.

If the decorrelation time for the noise is not greater than the propagation delay of the coupled signal, correlating the signals becomes more difficult. For instance, the received signal may need to be delayed to give the active cancellation unit time to generate the appropriate cancellation signal. In one embodiment, both the cancellation signal and the received signal are delayed for differing durations in order to correlate the signals in time.

Referring back to FIG. 3, the broad band noise is amplified along with the intentional signal component. The transmitter amplifies the signal to a comparatively high level because the signal attenuates as it travels. That is, in order for a receiver to receive the signal at some distant location, the signal must be amplified locally to a level above the amplitude needed at the receiver. The higher the amplification, the greater range at which the signal can be recovered.

Conversely, the signal 325 that the local receiver is trying to receive also attenuates as it travels. Even if signal 325 was transmitted at a comparatively high amplitude, the signal may be considerably attenuated by the time it reaches the local receiver. In the illustrated embodiment, in the vicinity of the local transmitter the amplified noise is higher than the signal 325 from the remote transmitter, effectively burying the signal. If the remote transmitter were located closer so that the signal attenuated less, or if the remote transmitter transmitted at a higher amplitude, the signal to noise ratio at the local receive may be high enough to extract the signal. In other words, the signal coupling from the local transmitter at the very least reduces the range of reception for the local receiver.

FIG. 4 illustrates one embodiment of active cancellation. In the illustrated embodiment, the active cancellation is narrow band, creating a notch 420 in the coupled signal. For instance, a narrow band active cancellation unit may use configurable delay paths and amplification to generate an inverted replica of the coupled signal. Segments of delay can be added or removed so that the difference in delay between the cancellation signal and the coupled signal at the receiver is one half of a wavelength. Half of a wavelength is 180 degrees out of phase, so the cancellation signal destructively interferes with the coupled signal.

The cancellation, however, is narrow because wavelength is a function of frequency. Configurable delay paths can only provide a 180 degree phase. shift at one particular frequency. In other words, accuracy falls off at frequencies farther away from a center frequency. In which case, performing active cancellation at the center frequency of the transmitter would only improve the signal to noise ratio for the receiver if the receiver and transmitter were operating in the same frequency band. Therefore, as shown in FIG. 4, active cancellation is performed at the center frequency of the local receiver.

Also illustrated in FIGS. 3 and 4 is the transmission spread spectrum band 340. A spread spectrum transmitter changes the center frequency at which it transmits at particular intervals. Spread spectrum transmitting is often used to improve security and/or reception. In the illustrated embodiment, the transmitter's center frequency 310 "hops" from one frequency to another within the spread spectrum band 340. Since the receiver's center frequency is also within the spread spectrum band 340, at some point the transmitter and receiver may operate at the same center frequency or the pass bands may overlap. In which case, to the extent that the pass bands of the transmitter and receiver overlap, active cancellation will cancel both the intentional signal component 315 and the broadband noise 320.

Narrow band active cancellation tends to be more difficult when the receiver is a spread spectrum receiver. For instance, each time a receiver's center frequency hops, the configurable delay paths of a narrow band active cancellation unit will need to be reconfigured. A spread spectrum receiver may frequency hop several thousand times per second. Reconfiguring delays at that speed may be prohibitively costly to implement.

Figure 5:
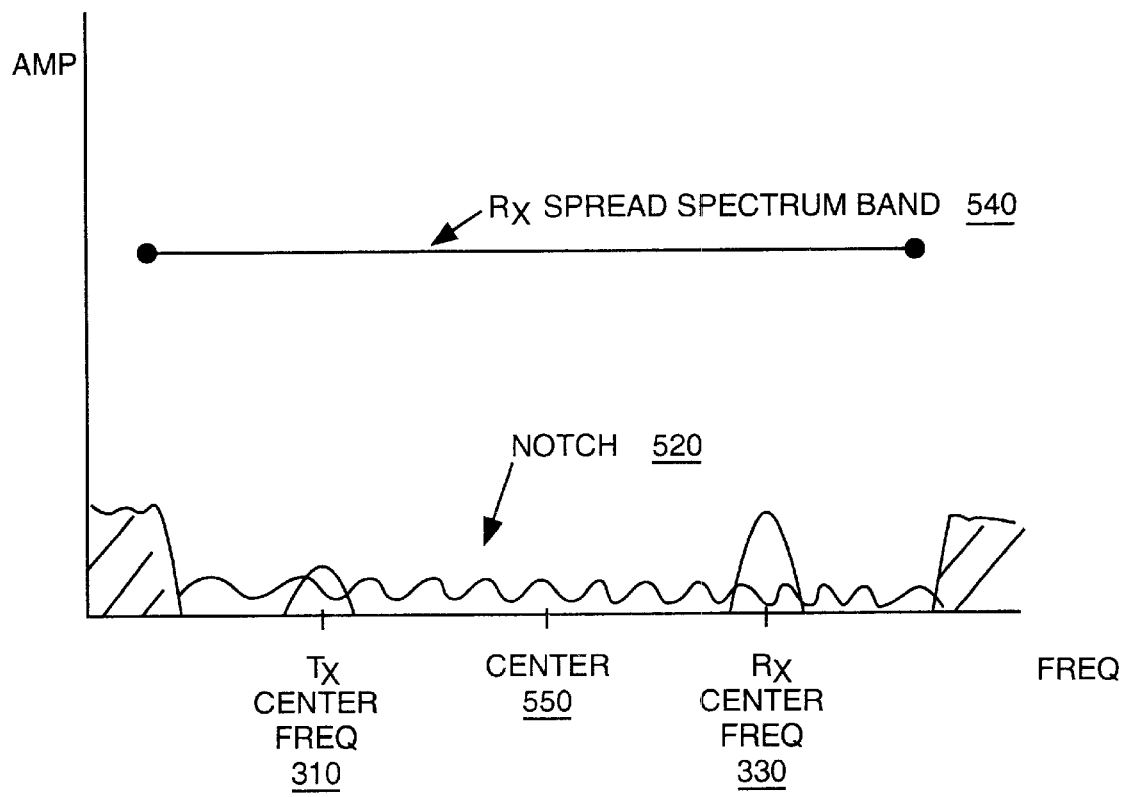
FIG. 5 illustrates one embodiment of the present invention for wide band active cancellation.

FIG. 5 illustrates one embodiment of wide band active cancellation. In the illustrated embodiment, the receiver is a spread spectrum receiver and its center frequency hops over the receiver spread spectrum band 540. Wide band active cancellation provides a notch 520 in the coupled signal that is wide enough to encompass the entire receiver spread spectrum band 540. Rather than centering the notch 520 at the receiver's center frequency, the notch can be centered at the center 550 of the spread spectrum band 540. In which case, unlike narrow band active cancellation, wide band active cancellation may not require any reconfiguring of path delays as the receiver's center frequency hops.

As discussed above, configurable delay paths tend to provide narrow band active cancellation because wavelength is a function of frequency so accuracy falls off at frequencies further away from the center frequency. In contrast, certain embodiments of wide band active cancellation rely on a true phase shift that can be applied over a wider frequency range. Any number of approaches can be used to phase shift and amplify a model signal in order to generate a wide band cancellation signal. A wide band active cancellation unit is described below with respect to FIG. 8.

In alternate embodiments, where, for instance, the broad band noise is band limited and/or the transmitter's spread spectrum band and the receiver's spread spectrum band only partially overlap, wide band active cancellation may be centered, around a frequency other than the center of the receiver's spread spectrum band. That is, active cancellation may only be needed where the transmitter's coupled signal overlaps with the receiver's spread spectrum. In which case, the notch may be smaller than the receiver's spread spectrum and; may only encompass the frequency range where it is needed.

As a practical matter, active cancellation generally cannot completely cancel a coupled signal. As used herein, "cancellation" refers to improved isolation. Active cancellation can provide a substantial amount of isolation between a transmitter and receiver. In practice, both narrow band and wide band active cancellation have provided over 20 db of suppression in notches in excess of 40 MHz for narrow band and in excess of 100 MHz for wide band. These levels of suppression have been achieved even for transmitters and receivers on the same chip.

Figure 6:
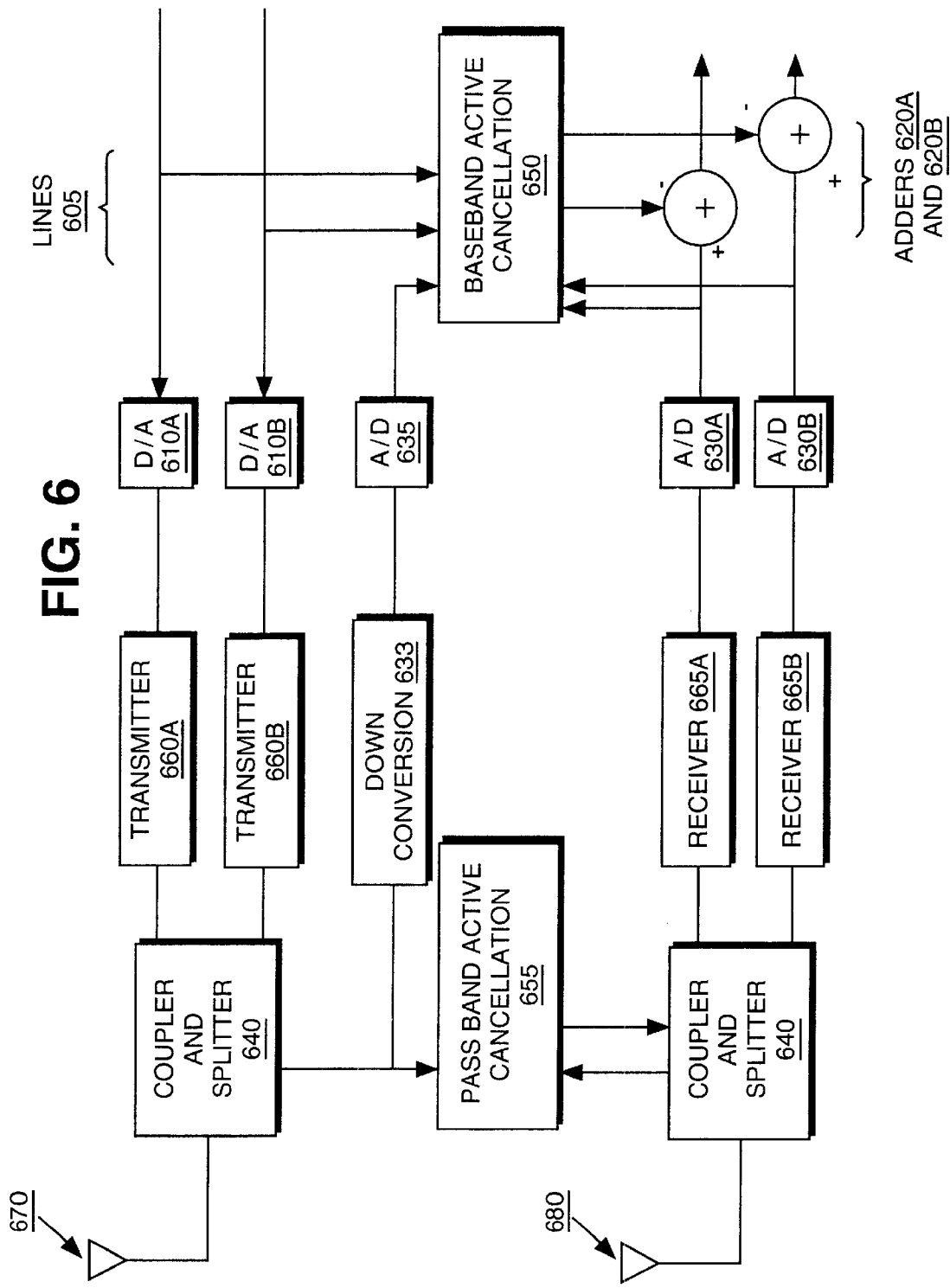
FIG. 6 illustrates one embodiment of the present invention for multiple radios.

FIG. 6 illustrates one embodiment of the present invention for isolating multiple radios in the same device or on the same chip. The illustrated embodiment includes both a pass band active cancellation unit 655 and a baseband active cancellation unit 650. In alternate embodiments, active cancellation can be performed using either the pass band or the baseband approach rather than both.

Transmitter 660A, receiver 665A, digital to analog converter 610A, and analog to digital converter 630A form a first analog radio. Transmitter 660B, receiver 665B, digital to analog converter 610B, and analog to digital converter 630B form a second analog radio. Both radios convert digital data from a host device (not shown) to analog data for transmission in analog form and receive analog data from a remote device (not shown) and convert it to digital data for the host device.

The digital to analog converters receive digital samples of a signal. In one embodiment, each digital sample represents an amplitude measurement of a low frequency analog signal, called a baseband signal, at a particular instant in time. In which case, the digital to analog converters generate the analog baseband signal from the samples. The baseband signal can carry data in any number of ways. For instance, data can be represented as amplitude, phase, and/or frequency modulations. The transmitter can convert the baseband signal to a pass band high frequency carrier signal in any number of ways. For instance, in one embodiment, the transmitter can multiply, or "mix," the baseband signal up to the carrier signal frequency. On the receiver side of the radio, the process is reversed.

In one embodiment, both radios are on one or more PCMCIA cards for use in a laptop computer. For instance, both radios could be on the same card or the radios could be on separate cards in separate card slots. Card slots may be located in an number of positions in a laptop computer, including stacked and/or side-by-side. The first radio may be a Bluetooth compliant radio and the second radio may be an IEEE 802.11 compliant radio. Both radios can be used for wireless data communications and both radios can operate within the same general frequency range. One or both radios may have spread spectrum capability so that at some point in time the radios are likely to operate in the same frequency band.

In the illustrated embodiment, each radio is a half duplex device. That is, each radio cannot simultaneously send and receive. But, both radios can be used simultaneously. For instance, both radios can receive at the same time, both radios can send at the same time, and one radio can receive while the other radio is sending.

This last situation, in which one radio is sending while the other is receiving, is essentially the same problem discussed above for the full duplex device. That is, when one transmitter transmits, it will generate a coupled signal that may over power the neighboring receiver, or at least reduce the receiver's reception range, unless the coupled signal is cancelled.

Assume for instance that transmitter 660A is transmitting and receiver 665B is receiving. Since the radios are half duplex, transmitter 660B is available to transmit a pilot tone. The pilot tone could be transmitted at the center frequency of receiver 665B or, for a spread spectrum receiver with wide band active cancellation, at the center of the spread spectrum band. Coupler and splitter 640 combines the pilot tone with the signal from transmitter 660A and provides the combined signal to the antenna 670. Coupler and splitter 640 also splits off a percentage of the combined signal and provides it as a model of the combined signal to pass band active cancellation unit 655 and, through down converter 633 and analog to digital converter 635, to baseband active cancellation unit 650. For instance, the splitter may be an unbalanced splitter which sends only a small percent of the signal off to the active cancellation units.

In alternate embodiments, where, for instance, one or more of the radios are full duplex, a radio's transmitter may not be available to transmit a pilot tone. In which case, additional components may be included to generate the pilot tone. For instance, where the pilot tone is based on the center frequency of the corresponding receiver, the receiver may include a local oscillator, such as a phase lock loop, to define its center frequency. An additional amplifier could be added to the circuit of FIG. 6 to transmit the center frequency from the receiver's local oscillator. For a full duplex radio in which both the transmitter and receiver share the same frequency band, the known signal from the transmitter itself could be used as the pilot tone. For wide band cancellation in which the cancellation notch is not necessarily centered on the center frequency of the receiver, an additional amplifier could be included to transmit at the desired center of the notch.

Of course, a notch may not be entirely symmetric around a pilot tone. For instance, active cancellation may fall off faster at higher frequencies than at lower frequencies or vice versa. In which case, a pilot tone may need to be transmitted at an off-center frequency that is anticipated to generated the desired cancellation notch.

The pilot tone can take any number of forms. In one embodiment, the pilot tone is simply a sinusoid having an amplitude higher than the broadband noise. In order to conserve power, the pilot tone does not have to be amplified as much at the signal being transmitted. After all, the pilot tone only needs to travel as far as the neighboring receiver.

In one embodiment of narrow band active cancellation in which the notch is centered at the receiver's center frequency, the pilot tone is transmitted at a particular offset from the receiver's center frequency. This is because a signal component from the receiver itself may couple into the received signal. For instance, a local oscillator in a receiver may generate noise at the center frequency of the receiver. In order to prevent the cancellation signal from being correlated to the wrong signal, a frequency offset can be used to distinguish the pilot tone from the receiver's own noise.

Referring again to FIG. 6, at coupler and splitter 645, the received signal is provided to pass band active cancellation unit 655. Pass band active cancellation unit 655 may use any number of phase shifters and amplitude adjusters to correlate the pilot tone in the model of the transmitted signal received from coupler and splitter 640 to the pilot tone in the received signal and to generate the cancellation signal. For instance, as discussed above, a configurable delay path and amplification would likely provide narrow band active cancellation. Wide band active cancellation, as discussed above, may use a true phase shift and amplification. An example of wide band active cancellation is described below with respect to FIG. 8.

Pass band active cancellation 655 provides the cancellation signal to coupler and splitter 645 which combines the signals and provides them to the appropriate receiver, receiver 665B in this example. The cancellation signal should reduce the noise level in the received signal. The amount of cancellation depends on the type and accuracy of the analog elements used in cancellation unit 655. Depending on the signal to noise ratio needed to recover the received signal, pass band cancellation alone may not be enough.

In the illustrated embodiment, the received signal goes through an additional stage of active cancellation in baseband active cancellation unit 650. Active cancellation in the digital domain operates in essentially the same way as it does in analog. Digital samples of the received signal are provided to the cancellation unit 650. Digital samples of the transmitted signal are also provided to the cancellation unit 650. The two signals are correlated and a cancellation signal is generated, which is an inverted replica of the coupled signal. The cancellation signal is subtracted from the digital received signal using adders 620A and 620B.

FIG. 6 illustrates two possible alternate sources for the digital samples that model the transmitted signal. One source of digital samples comes directly from the host device over lines 605. The digital samples over lines 605 represent the intentional transmitted signal component without the broad band noise. The broad band noise is not introduced until later on in the analog transmitters 660A and 660B. In which case, baseband active cancellation unit 650 would only cancel the intentional component of the transmitted signal to the extent that it overlaps the cancellation notch.

The other source of digital samples includes both the intentional signal component and the broad band noise. The model of the signal coming from splitter 640 is a portion of the carrier signal. Down conversion 633 converts the model down to the baseband. Analog to digital converter 635 converts the baseband signal to digital samples for the baseband active cancellation unit 650. The digital samples include both the intentional signal component and the broad band noise. In one embodiment, the two signals are correlated by matching what is left of the pilot tone in the received signal after pass band cancellation to the pilot tone in the transmitted signal.

Figure 7:
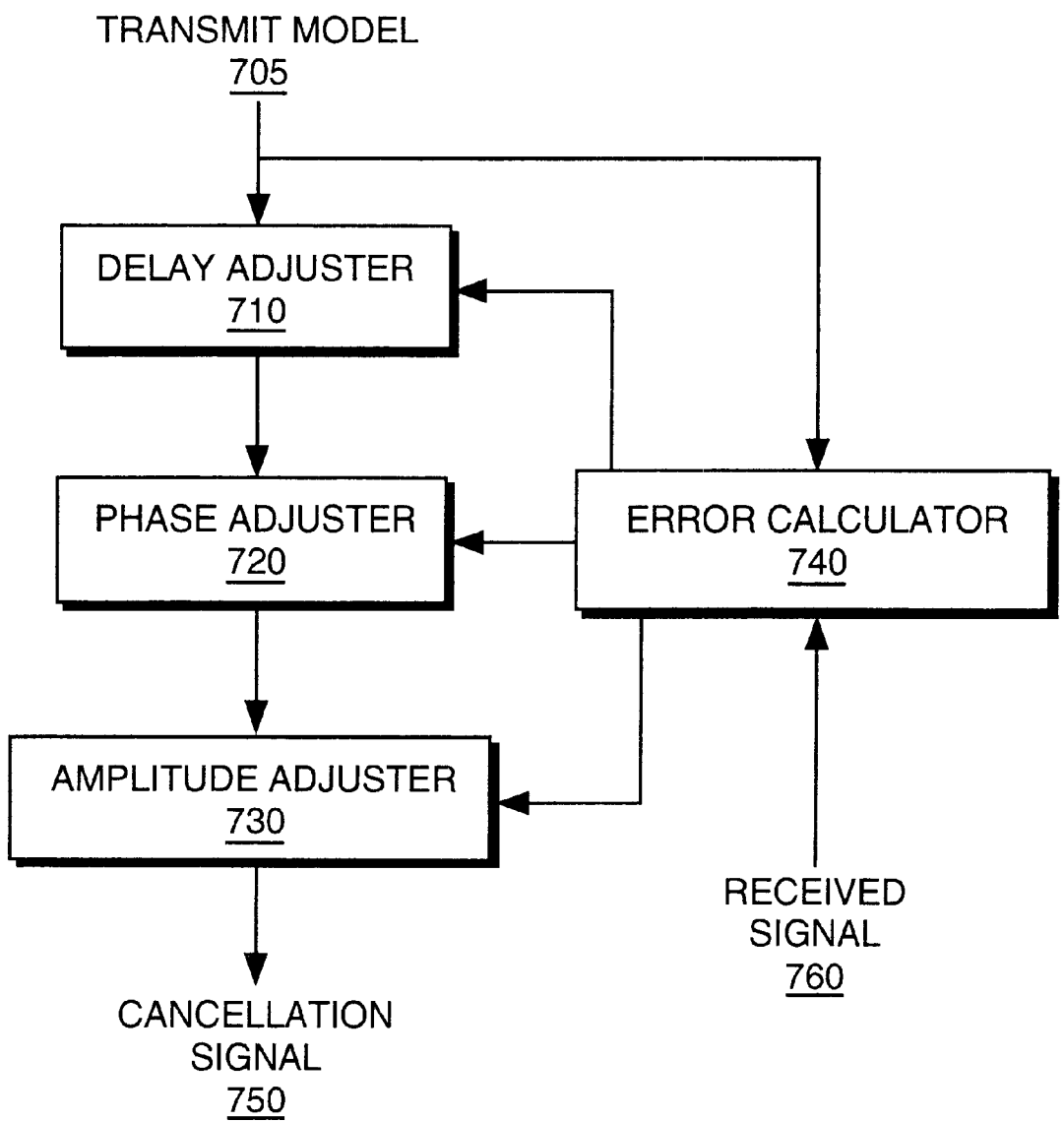
FIG. 7 illustrates one embodiment of the present invention for active cancellation in general.

FIG. 7 illustrates one embodiment of a generalized active cancellation unit. In some respects, the illustrated embodiment resembles echo cancellation in wireline applications. In wireline echo cancellation, a full duplex device sends and receives signals over a wire in the same frequency band. From the perspective of the wireline device, the channel characteristics of the wire can be thought of in terms of a filter. A transmitted signal is sent out, passes through some filter which causes complex delay, phase, and amplitude changes, and comes back in the form of an echo to the receiver. Wireline echo cancellation tries to cancel the echo by reconstructing the channel characteristics of the hypothetical filter.

Echo cancellation, however, is unheard of, and is generally believed to be impossible, in wireless applications. The filter characteristics of a wire are generally fairly static, making the filter easier to construct. A wireless transmission medium is thought to more dynamic, making the filter harder to construct.

Moreover, wireline echo cancellation is performed at the baseband level because wireline applications do not use high frequency carrier signals in the same sense that wireless applications do. Wireless echo cancellation has to deal with broad band noise at the pass band level. That is, unlike a wireline application, a wireless transmitter receives a baseband signal and "mixes" it to produce a high frequency carrier signal. In the process of mixing the baseband signal, the transmitter generates considerable broad band noise. The broad band noise alone may be enough to overpower a coupled receiver in the pass band portion of the receiver before ever reaching the baseband portion.

For instance, a wireless receiver generally includes one or more low noise amplifiers (LNA) in the pass band portion of the receiver. An LNA amplifier is supposed to amplify a received signal so that, for instance, the signal is strong enough to be processed by other elements in the receiver. An LNA is designed to operate within a certain range of input power. A coupled signal from a neighboring transmitter may be so strong that it can exceed the acceptable input range of an LNA, effectively saturating the receiver in the pass band. In other words, baseband wireline echo cancellation techniques would often be useless in Wireless applications because the problems begin to occur long before reaching the baseband.

Furthermore, given that the carrier frequency in wireless applications is generally very high relative to the data rate, or the rate of carrier modulations, channel characteristics for wireless active cancellation can generally be adequately modeled with a delay, phase, and amplitude adjustment. That is, the modulations of the carrier frequency change relatively slowly compared to the carrier frequency, so the wireless channel characteristics can be modeled with certain simplifications that are not possible in wireline applications without loosing significant data.

In the illustrated embodiment, wireless active cancellation is performed using the three adjusters, delay 710, phase 720, and amplitude 730, to generate cancellation signal 750. Error calculator 740 receives the model of the transmitted signal 705 and the received signal 760 and determines the error, or the difference, between them. Based on the differences, error calculator 740 instructs the adjusters appropriately. The same basic approach can be used in both pass band active cancellation and baseband active cancellation.

If the delay through the coupled path is short compared to the wavelength of the carrier modulations, the delay can be modeled as a phase shift, thereby eliminating the need for a separate delay adjustment. For instance, if the difference in the path delay for the coupled signal and the model of the transmitted signal is equal to a quarter of a wavelength, the shift between the signals remains within the same period or cycle. In which case, the coupled signal can be treated like a signal having different amplitude and phase, but is otherwise exactly the same as the transmitted signal.

Figure 8:
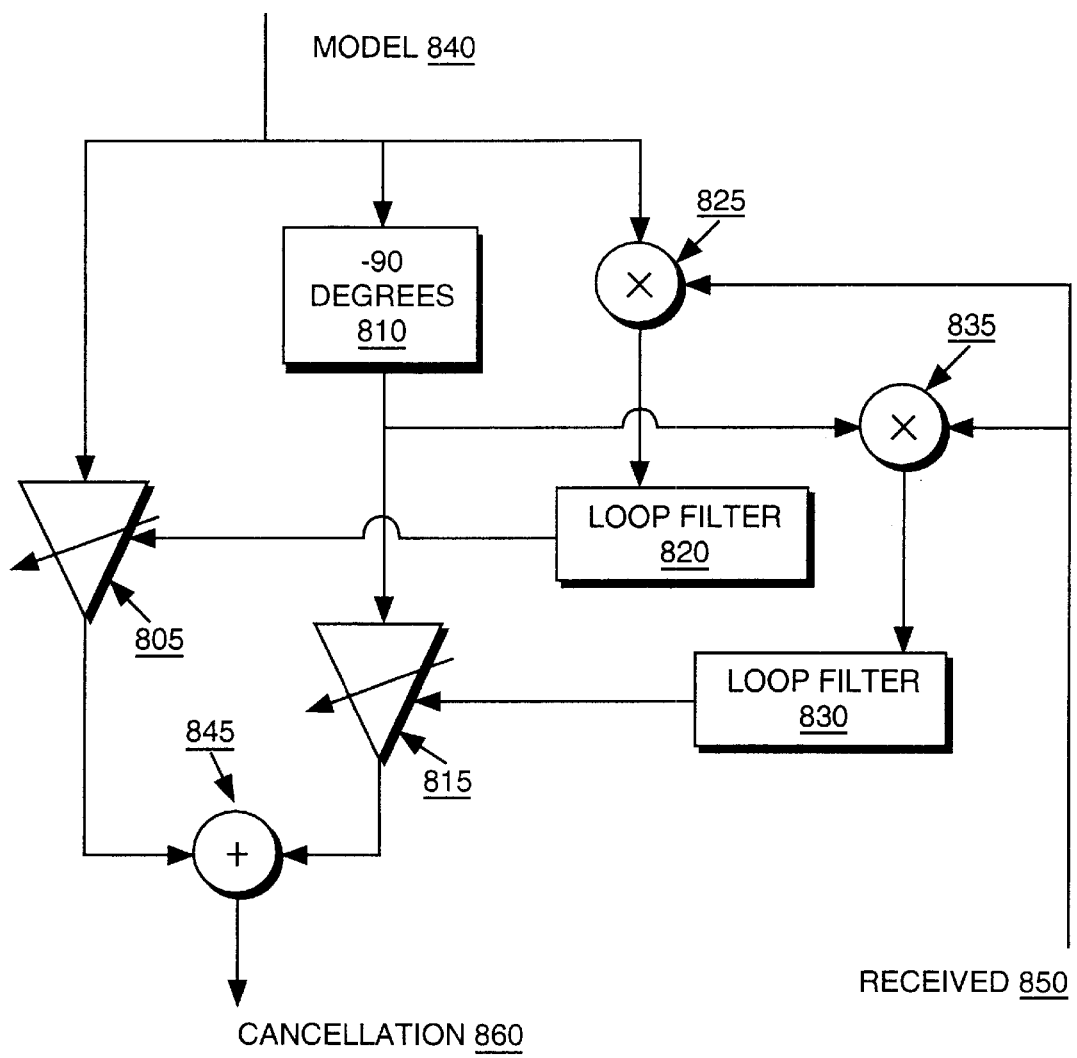
FIG. 8 illustrates one embodiment of the present invention for wide band active cancellation in the pass band.

FIG. 8 illustrates one embodiment of a wide band active cancellation unit for use at the pass band portion of the receiver. The adjustments to phase and amplitude are accomplished in the illustrated active cancellation unit by two bipolar amplifiers 805 and 815, a −90 degree phase shifter 810, and a summer 845. The error calculations are accomplished by two mixers 825 and 835 and two loop filters 820 and 830. In one embodiment, the received signal 850 is a feedback signal that includes both the cancellation signal and the coupled signal. In which case, the active cancellation unit operates like a phase lock loop, continuously adjusting cancellation signal 860 to reduce the error signal.

Bipolar amplifiers 805 are "bipolar" in the sense that they can amplify both positive and negative. Phase shifter 810 provides a quadrature of the model 840 of the transmitted signal. A "quadrature" relates to a mathematical representation of a signal. A signal can be mapped at any instant in time to a quadrant of a complex plane having an axis corresponding to a real number component of the signal and an axis corresponding to an imaginary component. Each quadrant corresponds to a −90 degree phase of the signal. For instance, the first quarter of a signal's cycle may map to the first quadrant of the complex plane, the second quarter may map to the second quadrant, and so on. Therefore, the quadrature signal maps to an adjacent quadrant of the complex plane and has the same magnitude as the model 840.

The bipolar amplifiers 805 and 815 can be adjusted to positively or negatively amplify the model 840 and its quadrature, and the results are combined by summer 845. The combination of these two signals can produce a cancellation signal 860 in any of the four quadrants of the complex plane.

The amount of amplification is determined by the error calculation portion of the circuit. The model 840 is mixed with the received signal 850 by mixer 825 to produce a proportional error signal. Basically, this is mixing a signal with itself in that the model 840 and the received signal 850 both include the same transmitted signal structure. Any small errors, or differences, between the signals can be attributed to differences in the transmission paths.

The quadrature signal from phase shifter 810 is mixed with the received signal 850 by mixer 835 to produce a proportional error signal. Small errors between these signals can be attributed to differences in the transmission paths and the −90 degree phase shift.

The in-phase error signal is provided to loop filter 820 and the out-of-phase error signal is provided to loop filter 830. The loop filters are low pass filters and integrators. Large errors can be attributed to other signal sources, such as the signal the receiver is trying to receive. Therefore, those errors are filtered out. The integrators add up all the remaining errors. The combined errors are proportional to the gain desired from the respective bipolar amplifiers 805 and 815.

The illustrated embodiment is particularly elegant. For instance, the only phase shift needed is a −90 degree phase shift which can be done over a comparatively wide frequency range with a comparatively high degree of accuracy. This is especially important for wide cancellation notches. The process can also be done continuously, making the cancellation signal adaptive to changes in the channel characteristics. Having two variables also guarantees convergence to one solution. That is, the circuit implements a quadratic in the form of the variable gain of bipolar amplifier 805 and the variable gain of bipolar amplifier 815. Modulation effects in the carrier frequency are automatically removed so it works for virtually any phase or frequency modulation of the carrier frequency.

Of course, any number of alternate approaches can be used for pass band active cancellation. For instance, four phase shifters could be used to map to the for different quadrants and four variable amplifiers could be used to move the signals around in the various quadrants. As discussed above, a number of configurable delays and gains could be used. In the illustrated embodiment of FIG. 8, a positive phase shift could be used instead of a negative phase shift.

Figure 9A:
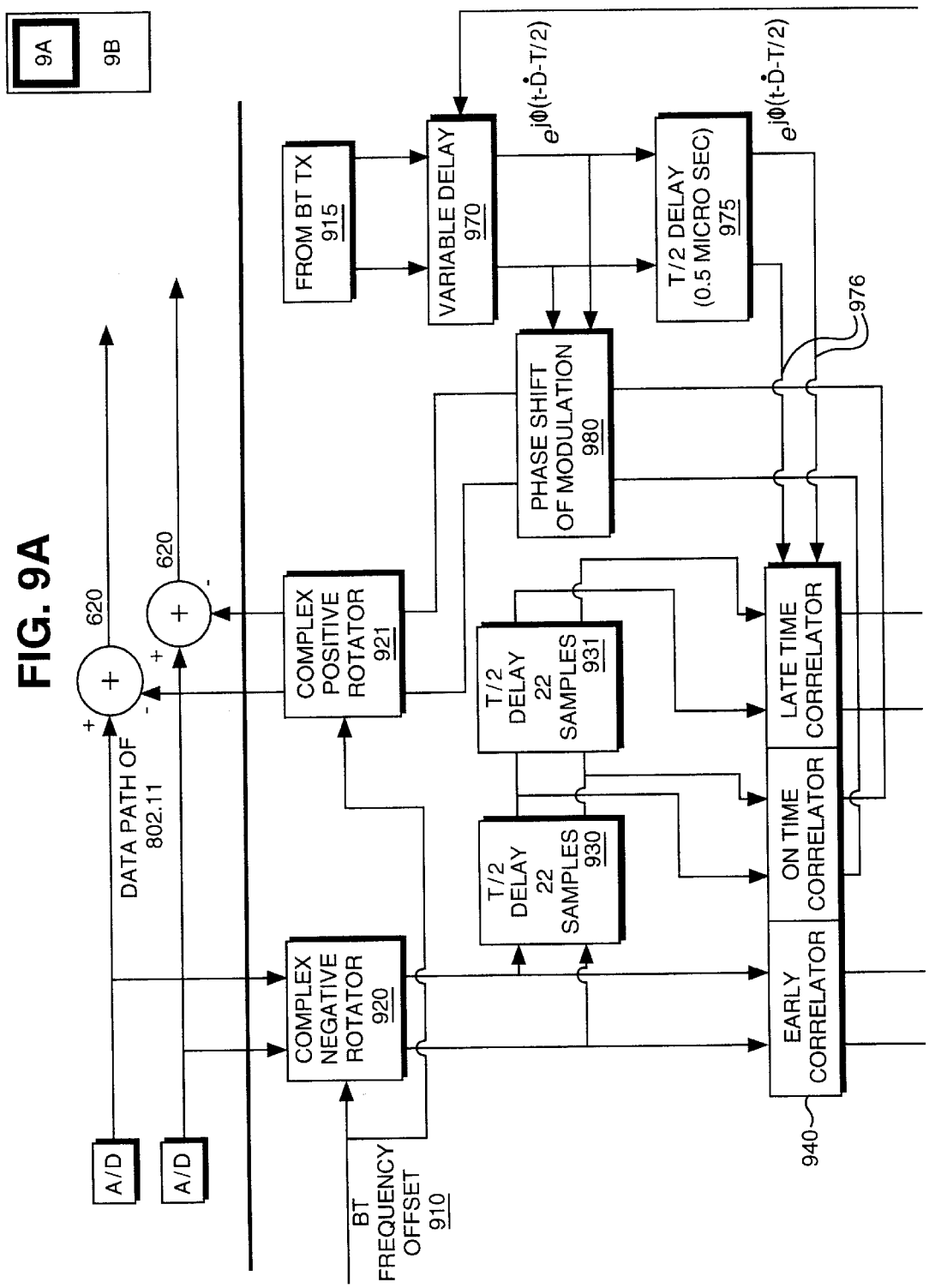
FIG. 9 illustrates one embodiment of the present invention for active cancellation in the baseband.
Figure 9B:
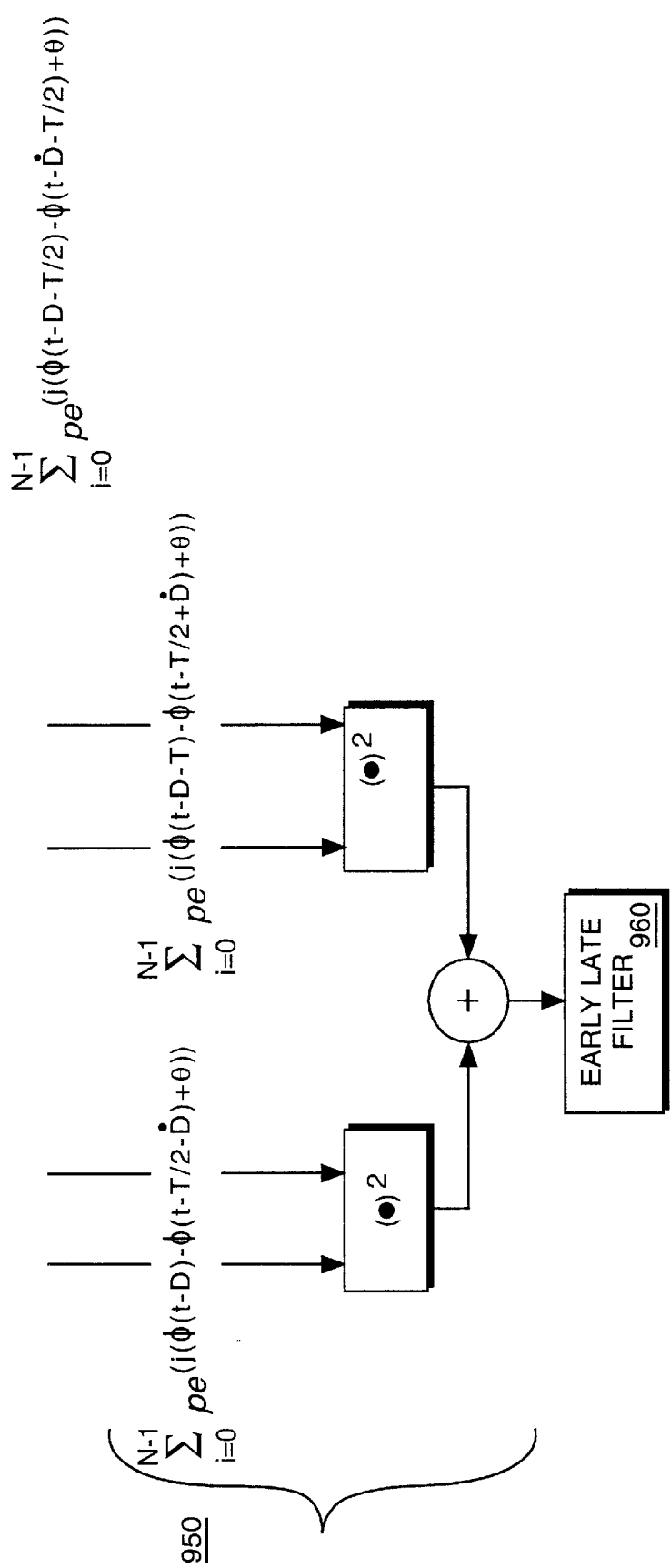

Similarly, baseband active cancellation can be implemented in any number of ways. FIG. 9 illustrates one embodiment of a baseband active cancellation unit, such as active cancellation unit 650 from FIG. 6. The baseband active cancellation unit operates much like the pass band active cancellation unit in that it determines an error signal and generates a cancellation signal based on the error. The illustrated embodiment is specifically directed to canceling a Bluetooth signal from an 802.11 signal. A similar approach can be used to cancel a coupled signal from virtually any received signal, including an 802.11 signal from a Bluetooth signal.

Error determination in the illustrated embodiment is based on a time tracking loop. Complex negative rotator 920 and positive rotator 921 receive a frequency offset 910 for the central frequency of the interference signal (the Bluetooth signal in this example). Rotator 920 also receives digital samples of the received signal. The output of rotator 920 is provided to early/late correlators bank 940 along with a first delayed version through delay element 930 and a second delayed version through delay element 931. Each delayed version is delayed by one-half of the period of the pulse duration of the interference signal so that each correlator correlates the delayed version with a feedback waveform 976. Square unit 950 computes the square of the early correlator and the square of the late correlator, and computes by subtraction the difference to get an error indication. The error indication is provided to early/late filter 960.

Variable delay unit 970 and shifter 980 generate the cancellation signal. Variable delay unit 970 receives the model of the transmitted Bluetooth signal 915 and the output of early/late filter 960. The Bluetooth signal is delayed to match the 802.11 signal based on the output of the early/late filter 960. The delayed Bluetooth signal is phase shifted by shifter 980 and is provided through positive rotator 921 to be subtracted from the 802.11 signal by adders 620. Delay 975 also receives the delayed Bluetooth signal and provides it as feedback waveform 976 to early/late correlators bank 940.

Those skilled in the art will recognize that the present invention can similarly be applied to more than two radios, as well as multiple full duplex radios. For instance, pilot tones could be added to each transmitted signal, and multiple cancellation signals could be generated by correlating to each pilot tone.

Figure 10:
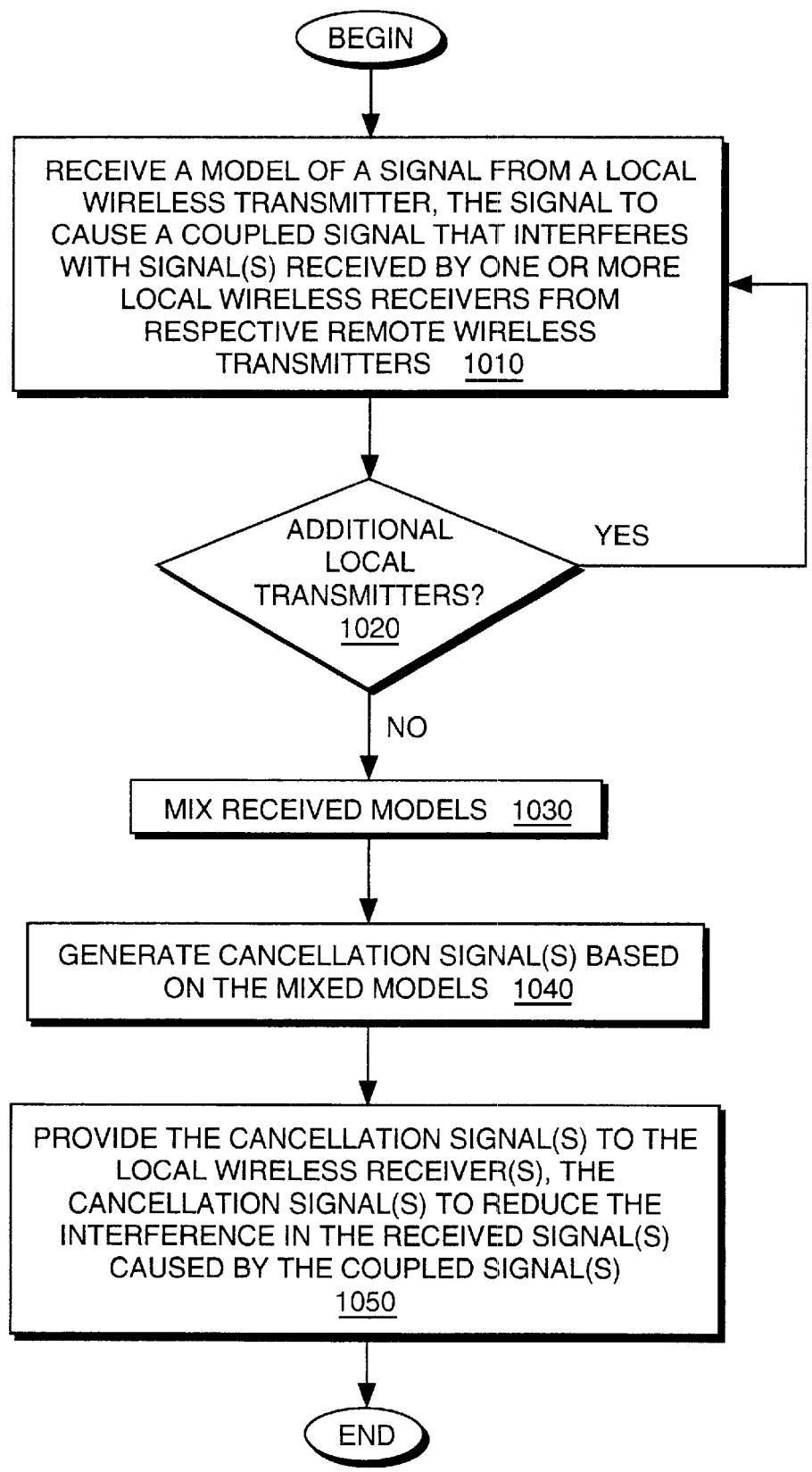
FIG. 10 demonstrates one embodiment of the present invention for active cancellation of several simultaneous transmissions.

FIG. 10 demonstrates one embodiment of the present invention as applied to multiple radios. A model of a signal transmitted from a local transmitter is received at 1010. The transmitted signal causes a coupled signal that interferes with the reception of one or more local wireless receivers. The wireless receivers are trying to receive signals from remote transmitters.

At 1020, if there are additional local transmitters that are transmitting, the process loops back to receive a model of the signal transmitted from the additional local transmitters. At 1030, the received models are mixed. At 1040, a cancellation signal is generated for each local receiver that is experiencing a coupled signal. At 1050, the cancellation signals are provided to the respective receivers.

In an alternate embodiment, if multiple transmitters share an antenna, the transmitted signals can be combined prior to tapping a model of the combined transmitted signal rather than tapping multiple models of the signals and mixing the models as suggested in FIG. 10. Any number of antenna configurations or arrays can be used. For instance, all local transmitters and receivers can have separate antennas, or they can share one antenna, or they can share selected antennas in any number of combinations.

Figure 11:
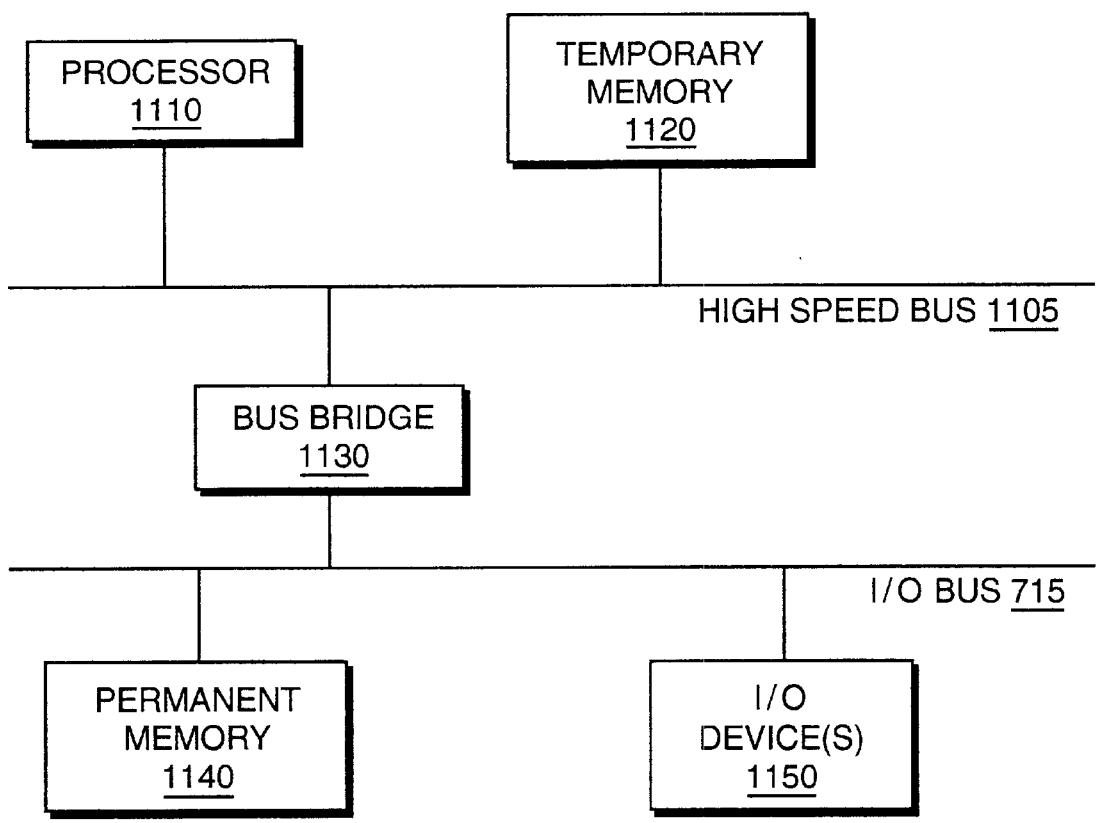
FIG. 11 illustrates one embodiment of a hardware system.

FIG. 11 illustrates one embodiment of a hardware system intended to represent a broad category of computer systems such as personal computers, workstations, and/or embedded systems. In the illustrated embodiment, the hardware system includes processor 1110 coupled to high speed bus 1105, which is coupled to input/output (I/O) bus 1115 through bus bridge 1130. Temporary memory 1120 is coupled to bus 1105. Permanent memory 1140 is coupled to bus 1115. I/O device(s) 1150 is also coupled to bus 1115. I/O device(s) 1150 may include a display device, a keyboard, one or more external network interfaces, etc.

Certain embodiments may include additional components, may not require all of the above components, or may combine one or more components. For instance, temporary memory 1120 may be on-chip with processor 1110. Alternately, permanent memory 1140 may be eliminated and temporary memory 1120 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more computers such as the hardware system of FIG. 11. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 1140.

Figure 12:
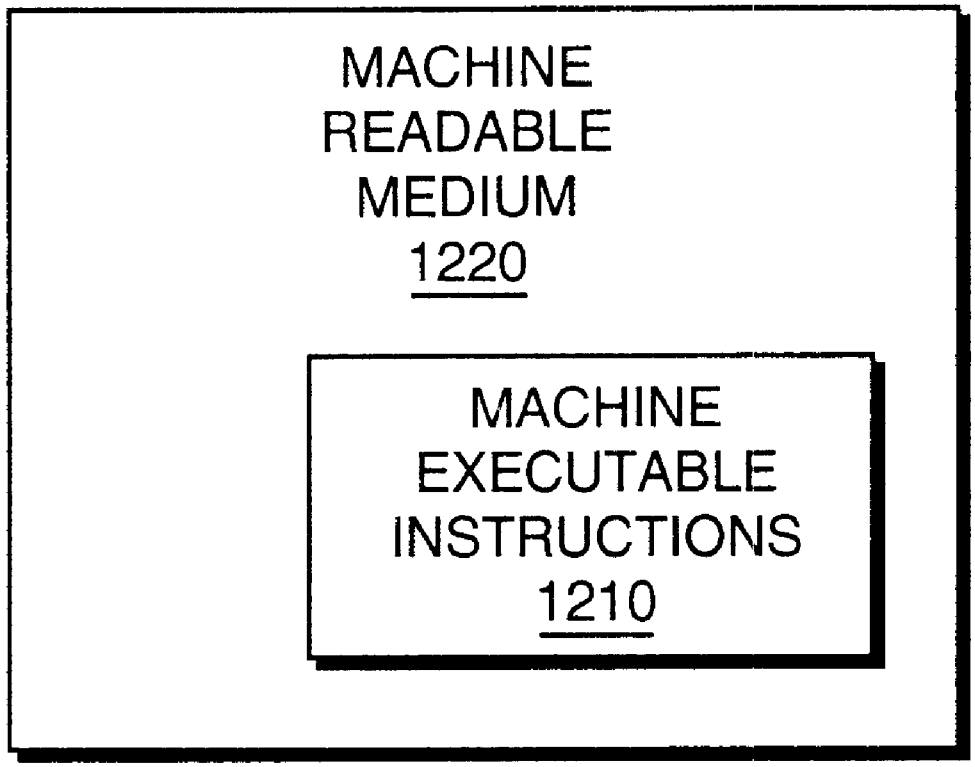
FIG. 12 illustrates one embodiment of a machine readable storage medium.

Alternately, as shown in FIG. 12, the software routines can be machine executable instructions 1210 stored using any machine readable storage medium 1220, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 1150 of FIG. 11.

From whatever source, the instructions may be copied from the storage device into temporary memory 1120 and then accessed and executed by processor 1110. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a method and apparatus for active cancellation of a wireless transmitted signal coupled in a wireless received signal is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. An apparatus comprising:

a quadrature phase shifter to phase shift a model of a first signal received from a first local wireless transmitter to provide a quadrature signal, said first signal to cause a coupled signal that interferes in a second signal received by a local wireless receiver from a remote wireless transmitter;

a first mixer to mix the model of the first signal with a signal received by the local receiver to provide a first mixed signal;

a second mixer to mix the quadrature signal with the signal received by the local receiver to provide a second mixed signal;

a first loop filter to integrate and low pass filter the first mixed signal to provide a first error signal;

a second loop filter to integrate and low pass filter the second mixed signal to provide a second error signal;

a first bipolar amplifier to amplify the model of the first signal in proportion to the first error signal to provide a first amplified signal;

a second bipolar amplifier to amplify the quadrature signal in proportion to the second error signal to provide a second amplified signal; and a summer to combine the first amplified signal and the second amplified signal to provide a cancellation signal to the local wireless receiver to reduce interference in the second signal caused by the coupled signal.

2. The apparatus of claim 1 wherein the local wireless transmitter and the local wireless receiver operate in a same frequency band.

3. The apparatus of claim 1 wherein the coupled signal comprises broad band noise and a signal component at a first center frequency in a first pass band, wherein the second signal is at a second center frequency in a separate pass band, and wherein the interference caused by the coupled signal is primarily caused by the broad band noise.

4. The apparatus of claim 3 wherein the broad band noise is band limited such that a decorrelation time of the broad band noise is greater than a propagation delay of the coupled signal.

5. The apparatus of claim 1 wherein the local wireless transmitter and the local wireless receiver comprise one of a full duplex communications device, components in separate full duplex communications devices, components in separate half duplex communications devices, and components in a combination of full duplex and half duplex communications devices.

6. The apparatus of claim 1 wherein the local wireless transmitter and the local wireless receiver comprise a single integrated circuit.

7. The apparatus of claim 1 wherein the local wireless transmitter comprises a Bluetooth transmitter and the local wireless receiver comprises an IEEE 802.11 receiver.

8. The apparatus of claim 1 wherein the first error signal and the second error signal represent errors between a pilot tone in the model of the first signal and the pilot tone in the coupled signal.

9. The apparatus of claim 8 wherein a frequency of the pilot tone is a center frequency of the cancellation signal.

10. The apparatus of claim 9 wherein the center frequency of the cancellation signal comprises a center frequency of the local wireless receiver.

11. The apparatus of claim 9 wherein the center frequency for the cancellation signal comprises an effective center of a wide band cancellation notch.

12. The apparatus of claim 8 wherein the pilot tone is intentionally offset a predetermined amount from a center frequency of the local wireless receiver.

13. The apparatus of claim 8 wherein the pilot tone is generated by an amplifier coupled to a local oscillator that defines a center frequency for the local wireless receiver, said amplifier to mix the pilot tone with an output of the local wireless transmitter.

14. The apparatus of claim 8 wherein the local wireless transmitter is a first local wireless transmitter, and wherein the pilot tone is generated by a second local wireless transmitter associated with the local wireless receiver.

15. The apparatus of claim 14 wherein an output of the second local wireless transmitter is one of coupled to a mixer to mix with an output of the first local wireless transmitter, and said second local wireless transmitter shares an antenna with the first local wireless transmitter.

16. A method comprising:

phase shifting a model of a first signal received from a first local wireless transmitter to provide a quadrature signal, said first signal to cause a coupled signal that interferes in a second signal received by a local wireless receiver from a remote wireless transmitter;

mixing the model of the first signal with a signal received by the local receiver to provide a first mixed signal;

mixing the quadrature signal with the signal received by the local receiver to provide a second mixed signal;

integrating and low pass filtering the first mixed signal to provide a first error signal;

integrating and low pass filtering the second mixed signal to provide a second error signal;

amplifying the model of the first signal in proportion to the first error signal to provide a first amplified signal;

amplifying the quadrature signal in proportion to the second error signal to provide a second amplified signal; and combining the first amplified signal and the second amplified signal to provide a cancellation signal to the local wireless receiver to reduce interference in the second signal caused by the coupled signal.

17. A machine readable medium having stored there on machine readable instructions to implement a method comprising:

phase shifting a model of a first signal received from a first local wireless transmitter to provide a quadrature signal, said first signal to cause a coupled signal that interferes in a second signal received by a local wireless receiver from a remote wireless transmitter;

mixing the model of the first signal with a signal received by the local receiver to provide a first mixed signal;

mixing the quadrature signal with the signal received by the local receiver to provide a second mixed signal;

integrating and low pass filtering the first mixed signal to provide a first error signal;

integrating and low pass filtering the second mixed signal to provide a second error signal;

amplifying the model of the first signal in proportion to the first error signal to provide a first amplified signal;

amplifying the quadrature signal in proportion to the second error signal to provide a second amplified signal; and combining the first amplified signal and the second amplified signal to provide a cancellation signal to the local wireless receiver to reduce interference in the second signal caused by the coupled signal.

* * * * *